United States Patent
Jeong et al.

(10) Patent No.: US 10,289,378 B2
(45) Date of Patent: May 14, 2019

(54) DEVICE AND METHOD FOR OUTPUTTING SOUND WAVE FOR CONTENT SYNCHRONIZATION BETWEEN DEVICES AND OPERATION CONTROL FOR EXTERNAL DEVICE, AND EXTERNAL DEVICE

(71) Applicant: POWERVOICE CO., LTD., Bucheon-si, Gyeonggi-do (KR)

(72) Inventors: Hee Suk Jeong, Gimpo-si (KR); Se Hun Chin, Incheon (KR); Hyung Yup Lee, Yongin-si (KR)

(73) Assignee: POWERVOICE CO., LTD. (KR)

( * ) Notice: Subject to any disclaimer, the term of this patent is extended or adjusted under 35 U.S.C. 154(b) by 0 days.

(21) Appl. No.: 15/024,358

(22) PCT Filed: Sep. 23, 2014

(86) PCT No.: PCT/KR2014/008856
§ 371 (c)(1),
(2) Date: Mar. 23, 2016

(87) PCT Pub. No.: WO2015/041507
PCT Pub. Date: Mar. 26, 2015

(65) Prior Publication Data
US 2016/0239257 A1    Aug. 18, 2016

(30) Foreign Application Priority Data
Sep. 23, 2013    (KR) .................. 10-2013-0112756

(51) Int. Cl.
*G06F 17/00*    (2019.01)
*G06F 3/16*    (2006.01)
(Continued)

(52) U.S. Cl.
CPC ............ *G06F 3/165* (2013.01); *H04B 11/00* (2013.01); *G10L 19/018* (2013.01)

(58) Field of Classification Search
CPC .... H04B 11/00; G10L 19/018; H04N 21/4394
See application file for complete search history.

(56) References Cited

U.S. PATENT DOCUMENTS

| 2009/0233582 A1* | 9/2009 | Suzuki | H04B 11/00 455/414.1 |
| 2012/0154633 A1* | 6/2012 | Rodriguez | H04M 1/72569 348/231.99 |
| 2015/0039321 A1* | 2/2015 | Neuhauser | G10L 19/02 704/500 |

FOREIGN PATENT DOCUMENTS

| KR | 20090104292 A | 10/2009 |
| KR | 20100108634 A | 10/2010 |

(Continued)

*Primary Examiner* — Thomas H Maung
(74) *Attorney, Agent, or Firm* — Renaissance IP Law Group LLP

(57) ABSTRACT

Disclosed are a device and a method for outputting a sound wave for content synchronization between devices and operation control of an external device, and the external device. The device for outputting a sound wave according to one embodiment of the present invention includes: a storage unit configured to store content data of content; a playing unit configured to play the content data; and an output unit configured to output a sound wave as a result of the playing of the content data, wherein the sound wave allows an external device to initiate an operation associated with the content.

5 Claims, 7 Drawing Sheets

(51) Int. Cl.
*H04B 11/00* (2006.01)
*G10L 19/018* (2013.01)

(56) References Cited

FOREIGN PATENT DOCUMENTS

| | | |
|---|---|---|
| KR | 20120080410 A | 7/2012 |
| KR | 20130013804 A | 2/2013 |
| WO | 2012092247 A1 | 7/2012 |

* cited by examiner

DEVICE AND METHOD FOR OUTPUTTING SOUND WAVE FOR CONTENT SYNCHRONIZATION BETWEEN DEVICES AND OPERATION CONTROL FOR EXTERNAL DEVICE, AND EXTERNAL DEVICE

TECHNICAL FIELD

The present invention relates to a device and a method for outputting a sound wave for an operation control of an external device and content synchronization between devices, and the external device.

BACKGROUND ART

In recent years, as smart home appliances having an Internet access function to home appliances and application programs embedded therein are getting popular, the number of smart devices owned by a user is gradually increased. The smart devices may access the Internet through a network, and transmit and receive data to and from devices through the network. In this case, when a user possesses a plurality of smart devices, data may be synchronized with the plurality of smart devices through the network.

In terms of the data synchronization method, Korean Patent Laid-Open Publication No. 2013-0013804 discloses a device for character and voice synchronization output device. However, these smart devices need communication modules such as WiFi or Bluetooth for data synchronization and the smart devices having the communication modules embedded therein cannot but be expensive. Further, a method for data synchronization using a communication module has a complicated procedure, and as a result the user may feel uncomfortable. Therefore, a method for data synchronization which may be cheap and readily available by anyone is required.

DISCLOSURE

Technical Problem

An object of the present invention is to provide a system, a device and a method for interworking between at least two devices without a separate wireless communication access, and for synchronizing data between at least two devices using a sound wave.

Another object of the present invention is to provide a method for data synchronization without additionally installing a separate module, by using a speaker and a mike embedded in a device.

However, the technical problem to be achieved by the embodiment of the present invention is not limited to the technical problems as described above, and therefore other technical problems may be present.

Technical Solution

According to an embodiment of the present invention, there is provided a device for outputting a sound wave, including: a storage unit configured to store content data of content; a playing unit configured to play the content data; and an output unit configured to output a sound wave as a result of the playing of the content data, wherein the sound wave allows an external device to initiate an operation associated with the content.

According to another embodiment of the present invention, there is provided a method for outputting a sound wave, including: storing content data of content; playing the content data; and outputting a sound wave as a result of the playing of the content data, wherein the sound wave allows an external device to initiate an operation associated with the content.

According to another embodiment of the present invention, there is provided a device for performing an operation corresponding to a sound wave, including: a sound wave input unit configured to receive a sound wave output from an external device; a control information acquisition unit configured to acquire control information using the received sound wave; and an operation performance unit configured to perform an operation based on the control information, wherein the operation is associated with a content that is being played by the external device.

Advantageous Effects

According to the embodiments of the present invention, it is possible to simplify and rapidly perform the process of data synchronization by using the system, the device and the method for interworking between at least two devices without the separate wireless communication access, and for synchronizing data between at least two devices using the sound wave.

Further, by using the speaker and the microphone embedded in the device, an installation of additional separate module is not required, and thereby reducing hardware costs in implementation.

BEST MODE

Figure 1:
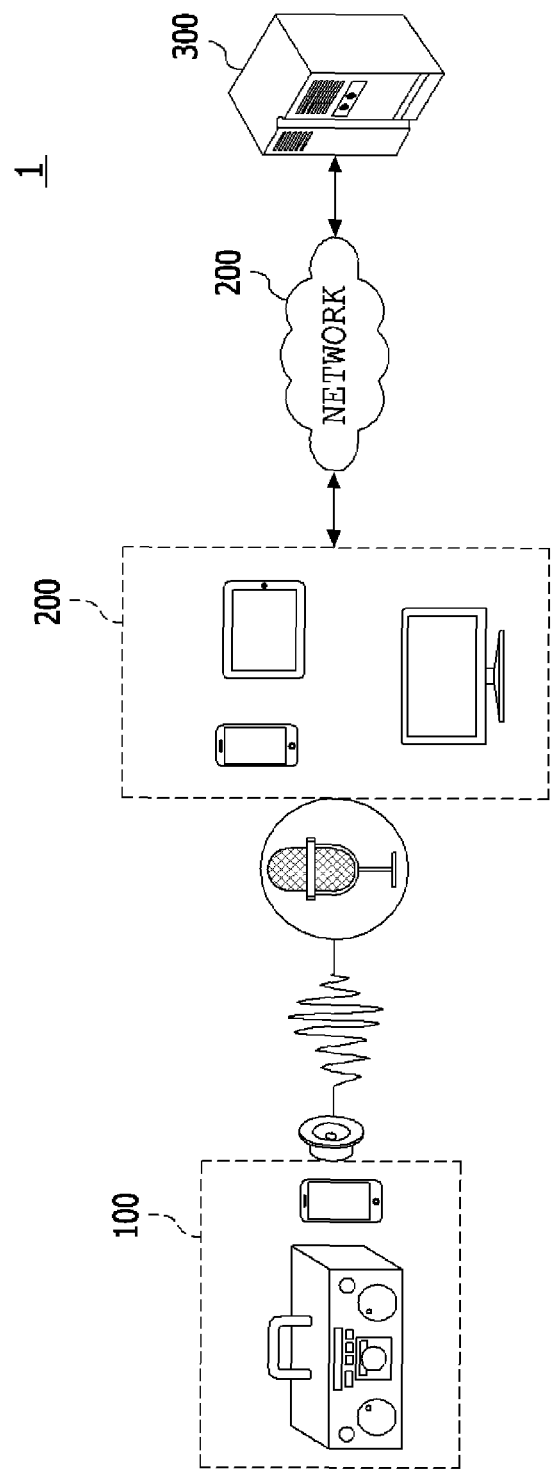
FIG. 1 is a view illustrating a configuration of a smart control system according to an embodiment of the present invention.

Hereinafter, embodiments of the present invention will be described in detail with reference to the accompanying drawings so that they can be easily practiced by those skilled in the art to which the present invention pertains. However, the present invention may be modified in various different ways and is not limited to the embodiments provided in the present disclosure. In the accompanying drawings, portions unrelated to the description will be described in order to obviously describe the present invention, and similar reference numerals will be denoted to similar portions throughout the present disclosure.

In addition, throughout the present disclosure, when any one part is referred to as being "connected to" another part, it means that any one part and another part are "directly connected to" each other or are "electrically connected to" each other with the other part interposed therebetween. In addition, unless explicitly described to the contrary, "comprising" any components will be understood to imply the inclusion of other elements rather than the exclusion of any other elements. It should be understood that presence or addition possibility of at least one features or figures, steps, operations, components, parts, or a combination thereof is not excluded.

In the present disclosure, a 'portion' includes a unit implemented by hardware, a unit implemented by software, and a unit implemented by both of the hardware and the software. Further, one unit may be implemented by at least two hardware, and at least two units may be implemented by one hardware.

In the present disclosure, some of operations or functions described as being performed by a terminal or a device may also be performed by a server connected to the corresponding terminal or device. Similarly, some of the operations or the functions described as being performed by the server may also be performed by a terminal or a device connected to the corresponding server.

The following embodiments are described in detail for helping understanding of the present invention and do not limit the scope of the present invention. Therefore, the invention of the same scope performing the same function as the present invention also belongs to the scope of the present invention.

FIG. 1 is a view illustrating a configuration of a smart control system according to an embodiment of the present invention.

Referring to FIG. 1, a smart control system 1 includes a device 100, an external device 200, and a control server 300. Further, as illustrated in FIG. 1, the smart control system 1 may further include a network device 250. The smart control system 1 of FIG. 1 is only an example of the present invention, and therefore the present invention is not restrictively understood only to FIG. 1. As a result, the smart control system may be variously changed from FIG. 1.

The device 100 stores content data of content, plays the stored content data, and outputs a sound wave as a result of the playing of the content data. In this case, a sound wave allows an external device 200 to initiate an operation associated with the content. The content data may be generated from a control server 300 or generated from a device 100 itself. An example of the content data may include video data corresponding to the content, audio data corresponding to the content, and sound wave data corresponding to control information. An example of the sound wave includes a first sound wave component corresponding to the audio data and a second sound wave component corresponding to the sound wave data. In this case, the first sound wave component may have a frequency selected within a range of 100 Hz to 16000 Hz, and the second sound wave component may have a frequency selected within a range of 16000 Hz to 24000 Hz.

The device 100 generates control information associated with the content, generates sound wave data corresponding to the generated control information, and plays the generated sound wave data and content data.

For example, the device 100 generates control information associated with e-book content or audio book content, generates sound wave data corresponding to the generated control information, and plays the generated sound wave data and content data. In this case, the device 100 may request images corresponding to the e-book content or the audio book content to be displayed on a display of the external device 200 using a sound wave.

The device 100 may synthesize the audio data and the sound wave data that are included in the content data to update the content data, and play the updated content data. For example, the sound wave output device 100 separates the audio data included in the video content, and synthesize the separated audio data and sound wave data, so as to update the synthesized data to single video content data again and play the same.

The device 100 may be an acoustic playing device including a speaker, such as an audio system, an MP3 device, a CD player, and a TV. Further, the device 100 may be a mobile communication apparatus having portability and mobility, and may include, for example, all types of handheld based wireless communication apparatuses such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a long term evolution (LTE) terminal, a smart phone, a smart pad, and a tablet PC.

The external device 200 receives the sound wave output from the device 100, acquires the control information using the received sound wave, and performs an operation based on the acquired control information. In this case, the operation may be associated with the content which is being played by the device 100. For example, when the device 100 outputs the sound wave including the control information associated with the audio book content, the external device 200 may receive the output sound wave to display images corresponding to the audio book content on a display.

An example of the external device 200 may be a mobile terminal which may access a server at a remote location through the network. Herein, the mobile terminal may be a mobile communication apparatus having portability and mobility, and may include, for example, all types of handheld based wireless communication apparatuses such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a long term evolution (LTE) terminal, a smart phone, a smart pad, a tablet PC, and a navigation device.

The control server 300 may interwork with the external device 200 through the network. For example, when receiving the sound wave of the device 100 from the external device 200 through the network, the control server 300 transfers the control information associated with the external device 200 to the external device 200 as a response to the sound wave. The control server 300 may also mean a cloud server.

The network means a connection structure which may exchange information between the respective nodes such as terminals and servers. An example of the network may include a 3rd generation partnership project (3GPP) network, a long term evolution (LTE) network, a world interoperability for microwave access (WIMAX) network, Internet, a local area network (LAN), a wireless local area network (Wireless LAN), a wide area network (WAN), a personal area network (PAN), a Bluetooth network, a satellite broadcasting network, an analog broadcasting network, a digital multimedia broadcasting (DMB) network, and the like, but it is not limited thereto.

Hereinafter, the operation of each component of FIG. 1 will be described in more detail with reference to the following drawings.

Figure 2:
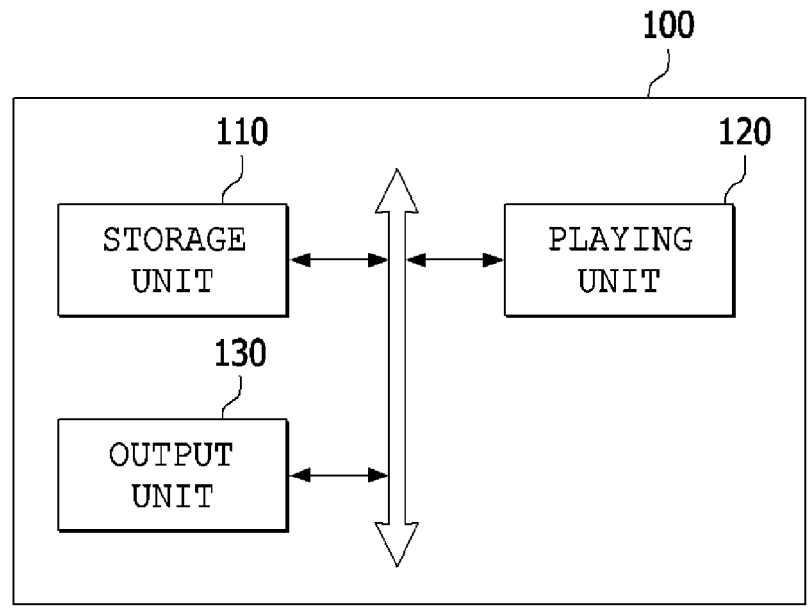
FIG. 2 is a block diagram illustrating a configuration of a device according to an embodiment of the present invention.

FIG. 2 is a block diagram illustrating a configuration of a device according to an embodiment of the present invention.

Referring to FIG. 2, the device 100 includes a storage unit 110, a playing unit 120, and an output unit 130. However, the device 100 illustrated in FIG. 2 is only an example of the present invention, and therefore may be variously changed based on the components illustrated in FIG. 2. For example, the device 100 may further include a user interface, a display, a power device, etc.

The storage unit 110 stores content data of content. The content may include e-book content, audio book content, music content, a road guide application, moving picture content, or the like, and the content data may include video data corresponding to the content, audio data corresponding to the content, and sound wave data corresponding to control information. In this case, the sound wave data corresponding to the control information may be generated from the control server 300 or generated from the device 100 itself.

The playing unit 120 plays the content data. In this case, the playing unit 120 may play the video data corresponding to the content data and the audio data corresponding to the content. Further, the playing unit 120 may play the content data updated from a data update unit 160. In this case, the updated content data may be one obtained by separating the moving picture data and the audio data from the existing content data, synthesizing the separated audio data with the sound wave data corresponding to the control information, and then combining the synthesized audio data with the moving picture data.

The output unit 130 outputs the sound wave as a result of the playing. In this case, the sound wave may be one sound wave in which the audio data and the sound wave data are combined with each other, and may include the first sound wave component corresponding to the audio data and the second sound wave component corresponding to the sound wave data. Further, the output unit 130 may output a first sound wave corresponding to the content data played by the sound wave output apparatus and output the second sound wave corresponding to the sound wave data played by the sound wave output apparatus. In this case, the first sound wave may include the first sound wave component corresponding to the audio data and the second sound may include the second sound wave component corresponding to the sound wave data. The first sound wave component corresponding to the audio data may have a frequency selected within a range of 100 Hz to 16000 Hz, and the second sound wave component corresponding to the sound wave data may have a frequency selected within a range of 16000 Hz to 24000 Hz.

In this case, the sound wave including the second sound wave component allows the external device 200 to initiate an operation associated with the content. For example, the content stored in the storage unit 110 is the e-book content or the audio book content, and when the playing unit 120 plays the e-book content or the audio book content, the output unit 130 may output the sound wave to allow the external device 200 to initiate the operation associated with the content. In this case, the operation associated with the content may display the images corresponding to the e-book content or the audio book content on the display of the external device 200.

According to the embodiment of the present invention, the device may be a mobile device, and when the content stored in the storage unit 110 is a music content, the playing unit 120 may play the music content if a call or a message is input to the mobile device. The output unit 130 outputs the sound wave as a result of the playing of the music content. In this case, the sound wave may allow the external device 200 to initiate the operation associated with the content. The external device 200 may receive the output sound wave to acquire the control information. In this case, the control information may be the input information of the call or the message. The external device 200 may initiate the operation of informing that the call or the message is input, based on the acquired control information.

Figure 3:
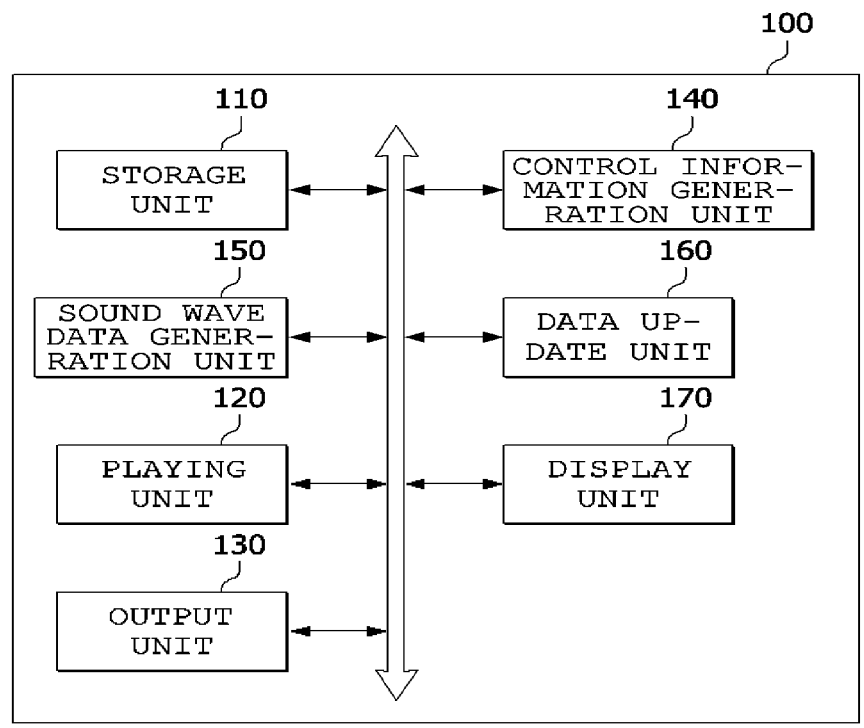
FIG. 3 is a block diagram for describing an operation of the device according to the embodiment of the present disclosure.

FIG. 3 is a block diagram for describing an operation of the device according to the embodiment of the present disclosure.

Referring to FIG. 3, the device 100 further includes a control information generation unit 140, a sound wave data generation unit 150, a data update unit 160, and a display unit 170.

According to the embodiment of the present invention, the control information generation unit 140 may generate the control information associated with the content. In this case, the control information allows the external device 200 to initiate the operation associated with the content and may include geographical coordinates corresponding to a search word input from a user interface, and may also include synchronization information, time information, etc., corresponding to moving picture content.

The sound wave data generation unit 150 may generate the sound wave data corresponding to the control information. The sound wave data generation unit 150 may identify an audible sound wave frequency band corresponding to a voice and a non-audible sound wave frequency band corresponding to a sound code, and generate and output voice data and the sound wave data for each identified frequency band by a sound QR (SQ) encoder application (App). The audible sound wave frequency band may be a frequency band within a range of 100 Hz to 16000 Hz, and the non-audible sound wave frequency band may be a frequency band within a range of 16000 Hz to 24000 Hz.

The data update unit 160 may synthesize the audio data and the sound wave data that are included in the content data to update the content data. For example, the data update unit 160 may separate the moving picture data and the audio data included in the existing content data, synthesize the separated audio data with the sound wave data to generate a single sound wave, and combine the generated sound wave with the moving picture data again to update the content data.

The display unit 170 may display an image or a text on the display of the device 100 as a result of the playing of the content data. When the display unit 170 displays the image or the text on the display, the output unit 130 may output the sound wave requesting the external device 200 to initiate the operation associated with the image or the text. In this case, the operation may display the image or the text on the display of the external device 200.

Figure 4:
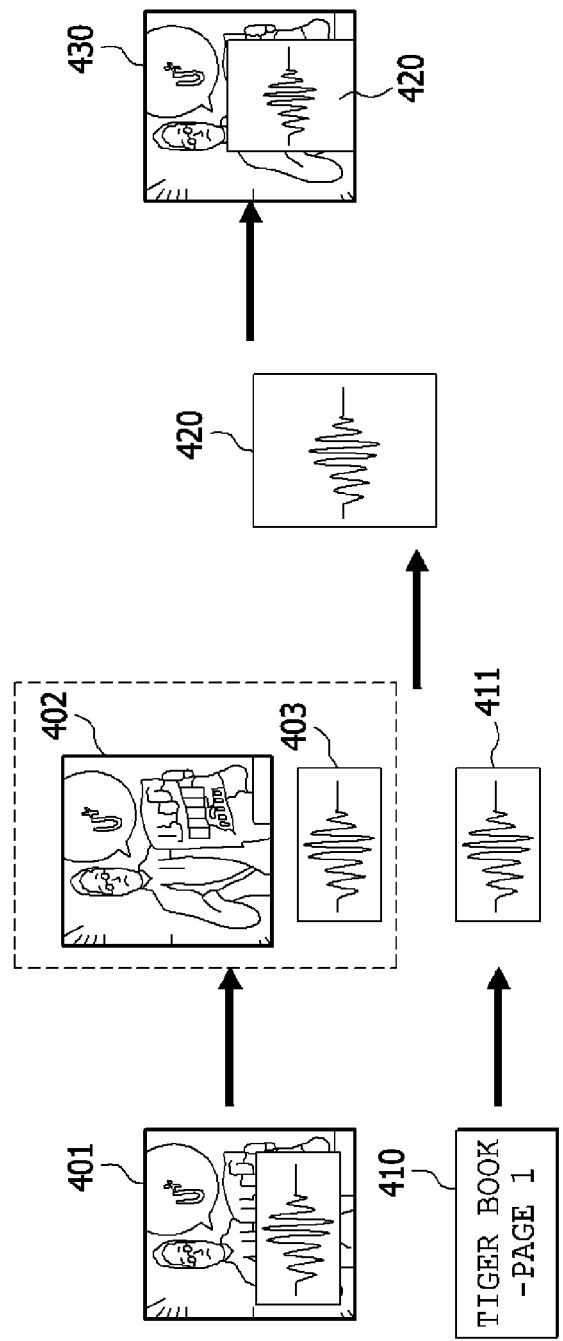
FIG. 4 is a view illustrating a process of updating content data by synthesizing audio data with sound wave data according to an embodiment of the present invention.

FIG. 4 is a view illustrating a process of updating content data by synthesizing the audio data with the sound wave data according to an embodiment of the present invention.

Referring to FIG. 4, the device 100 may synthesize the audio data with the sound wave data that are included in the content data to update the content data.

For example, it is assumed that a moving picture content 401 as a first content and an audio book content 410 as a second content are stored in the storage unit 110. In this case, the content data of the moving picture content 401 may include video data 402 and audio data 403, and the storage unit 110 may separate and store the video data 402 and the audio data 403 of the moving picture content.

The control information generation unit 140 generates the control information associated with the audio book content 410. In this case, the control information allows the external device 200 to initiate the operation associated with the audio book content 410, and may include an initialization command to display the image corresponding to the audio book content 410 on the display of the external device 200.

The sound wave data generation unit 150 generates sound wave data 411 corresponding to the control information generated from the control information generation unit 140. In this case, the sound wave data 411 may be generated by a sound QR (SR) code encoder.

The data update unit 160 may synthesize the audio data and the sound wave data that are included in the content data to update the content data. For example, the data update unit 160 may synthesize (420) the audio data 403 included in the content data of the moving picture content 401 with the sound wave data 411 corresponding to the audio book content 410 to update the synthesized data to the content data 430 of the moving picture content. In this case, the updated content data 430 of the moving picture content includes the video data corresponding to the moving picture content, the audio data corresponding to the moving picture content, and the sound wave data corresponding to the control information.

Figure 5:
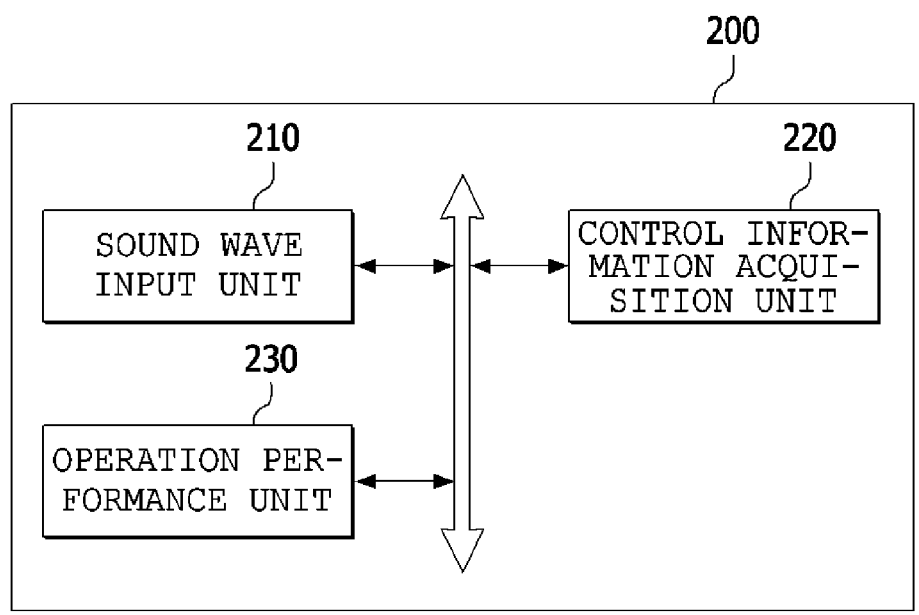
FIG. 5 is a block diagram illustrating a configuration of an external device according to an embodiment of the present invention.

FIG. 5 is a block diagram illustrating a configuration of an external device according to an embodiment of the present invention.

Referring to FIG. 5, the external device 200 includes a sound wave input unit 210, a control information acquisition unit 220, and an operation performance unit 230. However, the external device 200 illustrated in FIG. 5 is only an example of the present invention, and therefore may be variously changed based on the components illustrated in FIG. 5. For example, the external device 200 may further include the user interface, the display, the power device, etc.

The sound wave input unit 210 receives the sound wave output from the external device. In this case, the external device may be the device 100 that outputs the sound wave. For example, the sound wave input unit 210 may each receive the first sound wave corresponding to the audio data and the second sound wave corresponding to the sound wave data from the device 100. As another example, the sound wave input unit 210 may also receive one sound wave in which the first sound wave component corresponding to the audio data and the second sound wave component corresponding to the sound wave data are synchronized with each other. In this case, the first sound wave component may have a frequency selected within a range of 100 Hz to 16000 Hz, and the second sound wave component may have a frequency selected within a range of 16000 Hz to 24000 Hz.

The control information acquisition unit 220 uses the input sound wave to acquire the control information. For example, when the device 100 is the mobile device and the content is the road guide application, the control information acquired by the control information acquisition unit 220 may be the geographical coordinates corresponding to the search word input from the user interface. As another example, when the device 100 is the mobile device and the content is the moving picture content, the control information acquired by the control information acquisition unit 220 may be the synchronization information or the time information corresponding to the moving picture content.

The operation performance unit 230 performs the operation based on the control information. In this case, the operation is associated with the content which is being played by the device 100. For example, when the device 100 is playing the e-book content or the audio book content, the operation performance unit 230 may display the images corresponding to the e-book content or the audio book content on the display. As another example, when the call or the message is input to the device 100 to play the music content, the operation performance unit 230 may initiate the operation of informing that the call or the message is input. As another example, when the device 100 is using the road guide application, the operation performance unit 230 may display the search word on the display based on the control information including the geographical coordinates corresponding to the search word input from the user interface. As another example, when the device 100 is playing the moving picture content, the operation performance unit 230 may perform the synchronization information or the time information based on the control information including the synchronization information or the time information corresponding to the moving picture content.

Figure 6:
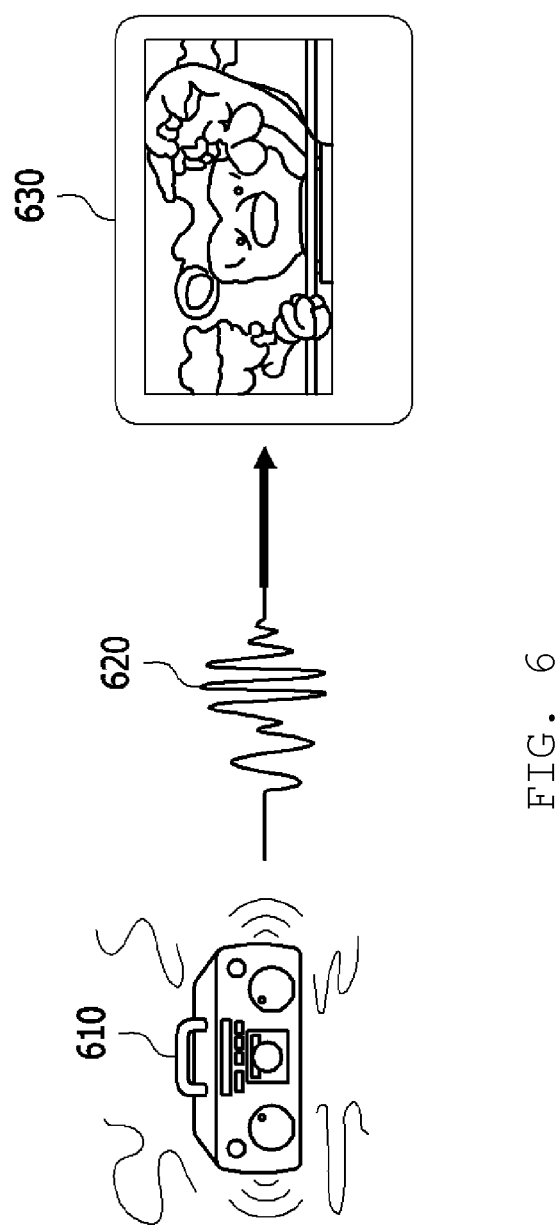
FIG. 6 is a view illustrating that images corresponding to the content are displayed on a display of the external device using a sound wave according to the embodiment of the present invention.

FIG. 6 is a view illustrating that images corresponding to the content are displayed on a display of the external device using the sound wave according to the embodiment of the present invention.

Referring to FIG. 6, a sound source player 610 may store the content data of the e-book content or the audio book content and play the content data. In this case, the content data of the e-book content or the audio book content may include the video content corresponding to the content, the audio data corresponding to the content, and the sound wave data corresponding to the control information.

In this case, the device 100 may be the sound source player (for example, a CD player, an audio system, an MP3 device) having a speaker embedded therein, the external device 200 may be a mobile device 630, and the content may be the e-book content or the audio book content. The sound source player 610 outputs the sound wave as a result of the playing through the speaker. In this case, the sound wave may be output as the first sound wave corresponding to the audio data of the e-book content or the audio book content and the second sound wave corresponding to the sound wave data, respectively. Further, the sound wave may be output as one sound wave in which the first sound wave component corresponding to the audio data of the e-book content or the audio book content and the second sound wave component corresponding to the sound wave data are combined. In this case, the sound wave data may be generated as the sound QR code by a type of sound QR (SQ) encoder application. The first sound wave component may have a frequency band within a range of 100 Hz to 16000 Hz, and the second sound wave component may have a frequency band within a range of 16000 Hz to 24000 Hz. For example, when the sound source player 610 plays the audio book content called 'tiger book', the sound source player 610 may output a sound wave 620 that includes a first sound wave component corresponding to the audio data and a second sound wave component corresponding to the sound wave data of page 1 of the 'tiger book'. In this case, the sound wave 620 may request the images corresponding to the 'tiger book' to the mobile device 630 using the second sound wave component.

The mobile device 630 receives the sound wave 620 from the sound source player 610. The mobile device 630 may analyze the sound QR code of the received sound wave 620 using the sound QR (SQ) code decoder application and acquire the control information using the analyzed sound QR code. In this case, the control information may be information on a book title and a page. For example, it is assumed that the sound source player 610 plays the sound wave and receives the sound wave output from the mobile device 630. In this case, the sound wave may include the audio data and the sound wave data corresponding to page 1 of the 'tiger book'.

The mobile device 630 may analyze the title and page of the audio book content that is currently playing the received sound wave. In this case, the mobile device 630 may execute the corresponding e-book based on the analyzed book title and page, and execute the page corresponding to the executed e-book. For example, the mobile device 630 may search and execute the e-book of the title called the 'tiger book' using the e-book application, and execute page 1 of the e-book called the 'tiger book'.

Figure 7:
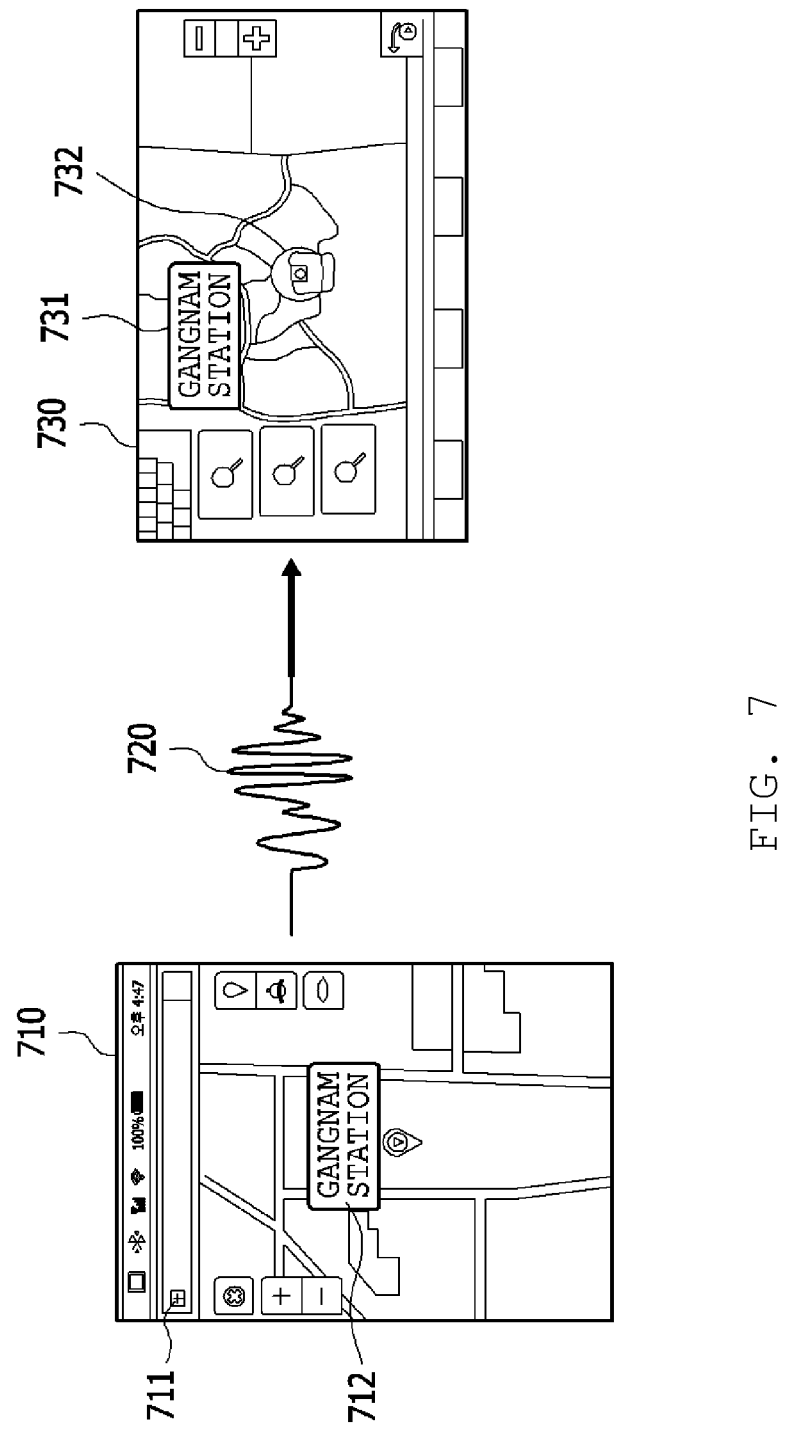
FIG. 7 is a view illustrating that geographical coordinates corresponding to a search word input to a road guide application in a mobile device according to an embodiment of the present invention are displayed on a navigation device.

FIG. 7 is a view illustrating that geographical coordinates corresponding to a search word input to a road guide application in a mobile device according to an embodiment of the present invention are displayed on a navigation device.

Referring to FIG. 7, the device 100 is a mobile device 710, the external device 200 is a navigation device 730, and the content is the road guide application. The mobile device 710 may store the content data of content, play the content data, and display an image or a text on the display of the device as a result of the playing of the content data. For example, the mobile device 710 searches for (711) 'Gangnam station' using the road guide application. The mobile device 710 may display a location of the searched 'Gangnam station' 712 on the display.

The mobile device 710 may extract a designation name and GPS information at which the corresponding designation is located, and generate the sound wave in a sound QR code form using the sound QR (SQ) encoder application. In this case, the control information may include the geographical coordinates corresponding to the search word input from the user interface. The mobile device 710 may output the generated sound wave 720 and transmit it to the navigation device 730. For example, the mobile device 710 may generate the sound wave 720 including geographical coordinates 712 corresponding to the search word 711 called 'Gangnam station' input from the user interface.

The mobile device 710 may output the sound wave allowing the navigation device 730 to initiate the operation associated with the content as a result of the playing. In this case, the operation displays a search word on the display of the navigation device 730. For example, a 'Gangnam station' 731 that is a search word of the navigation device 730 and geographical coordinates 732 corresponding to the 'Gangnam station' 731 may be displayed on the display.

The navigation device 730 receives the sound wave from the mobile device 710 through a microphone, and records the received sound wave. The navigation device 730 may analyze the sound QR code of the sound wave using the sound QR (SQ) decoder application, and acquire the control information using the analyzed sound QR code. The navigation device 730 may analyze the search word and the geographical coordinates corresponding to the search word based on the acquired control information to search for the corresponding destination, and may display the search word 731 and geographical coordinates 732 of the destination on the display.

Figure 8:
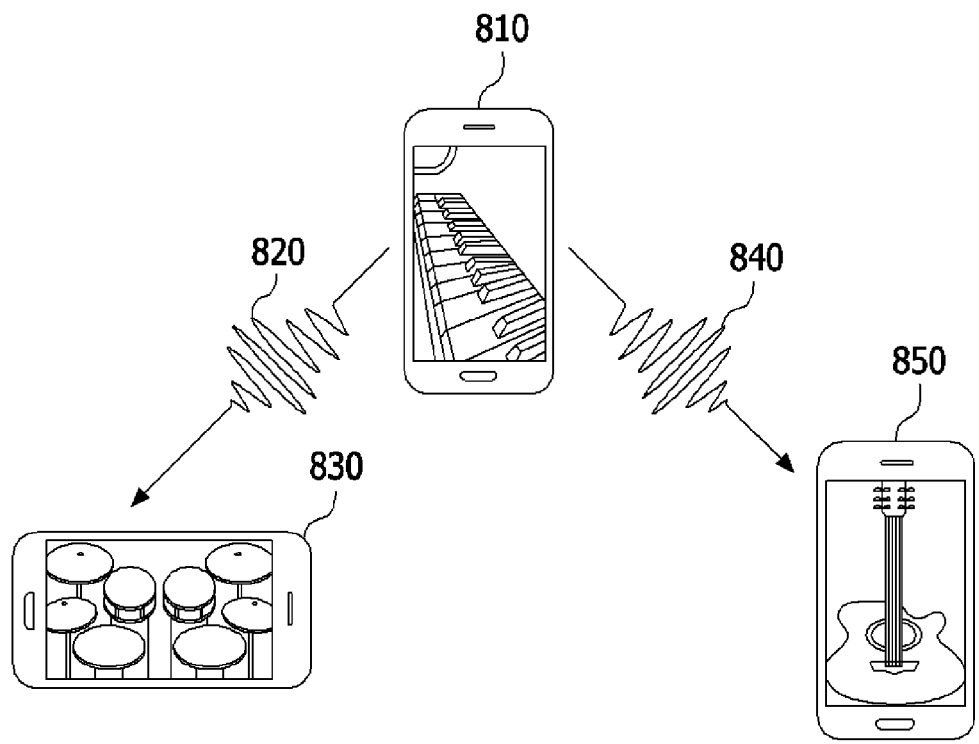
FIG. 8 is a view illustrating that a musical instrument is played using a sound wave output from the mobile device according to the embodiment of the present invention, along with an external mobile device.

FIG. 8 is a view illustrating that a musical instrument is played using the sound wave output from the mobile device according to the embodiment of the present invention, along with an external mobile device.

Referring to FIG. 8, a device 810 may be a mobile device, external devices 830 and 850 may be an external mobile device, and the content transmitted and received between the mobile device and the external mobile device may be, for example, a moving picture content. In this case, the mobile device 810 may be operated as a master device, while the external devices 830 and 850 may be operated as a slave device.

The mobile device 810 stores and plays content data of moving picture content. The content data may include video data corresponding to the content, audio data corresponding to the content, and sound wave data corresponding to control information. In this case, the control information may include the synchronization information or the time information corresponding to the moving picture content. The mobile device 810 outputs the sound wave as a result of the playing of the content data. In this case, the sound wave includes the first sound wave component corresponding to the audio data and the second sound wave component corresponding to the sound wave data, the first sound wave component may have a frequency selected within a range of 100 Hz to 16000 Hz, and the second sound wave component may have a frequency selected within a range of 16000 Hz to 24000 Hz. Further, the sound wave allows the external mobile devices 830 and 850 to initiate the operation associated with the content, and the operation may be an operation of the external mobile devices 830 and 850 corresponding to the synchronization information or the time information.

For example, it is assumed that one mobile device 810 uses a musical instrument application to play a piano, and two external mobile devices 830 and 850 use a musical instrument application to play a drum and other musical instruments, respectively. In this case, the mobile device 810 is operated as the master device, while the external mobile devices 830 and 850 may be operated as the slave device. The mobile device 810 may use the musical instrument application to select a musical program to be played.

The control information generation unit of the mobile device 810 generates first control information and second control information. In this case, the control information generation unit may extract a play staring time for each play bar for the selected play musical program to generate the control information. In this case, the control information includes the synchronization information or the time information corresponding to the musical instrument application, and the first control information may mean the control information on the first external mobile device 830 playing the drum, and the second control information may mean the control information on the second external mobile device 850 playing a guitar.

The sound wave data generation unit of the mobile device 810 generates the first sound wave data corresponding to the first control information and the second sound wave data corresponding to the second control information. In this case, when the first external mobile device 830 plays the drum, the first sound wave data may synchronize a play time, tempo, etc. of the piano played by the mobile device 810 and when the second external mobile device 850 plays the guitar, the second data may synchronize the play time, tempo, etc. of the piano played by the mobile device 810.

The playing unit plays the first sound wave data, the second sound wave data, and the content data. The playing unit may play the first sound wave data allowing the first external device 830 to initiate the drum performance while playing the piano content data and play the second sound wave data allowing the second external device 850 to initiate the guitar performance.

The output unit outputs the first sound wave 820 and the second sound wave 840 through the speaker. The first sound wave 820 allows the first external device 830 to initiate a first operation associated with the content, and the second sound wave 840 allows the second external device 850 to initiate a second operation associated with the content. Further, the output unit may output one sound wave including the first sound wave component and the second sound wave component. In this case, the first sound wave component allows the first external device 830 to initiate the first operation associated with the content, and the second sound wave component allows the second external device 850 to initiate the second operation associated with the content. In this case, the first operation means the initialization of the drum performance and the second operation means the initialization of the guitar performance.

The sound wave input unit of each of the external devices 830 and 850 receives the sound wave output from the mobile device through the microphone. In this case, the first external device 830 may receive the first sound wave 820 and the second external device 850 may receive the second sound wave 840. Further, the first external device 830 and the second external device 850 may also receive one sound wave including the first sound wave component and the second sound wave component.

The control information acquisition unit of each of the external devices 830 and 850 uses the input sound waves 820 and 840 to acquire the control information. In this case, the control information acquisition unit records the received sound waves 820 and 840 and analyzes the sound QR code of the sound wave using the sound QR (SQ) decoder application. The control information acquisition unit may acquire the control information based on the analyzed code. In this case, the control information may be a play bar and a play starting time.

The operation performance unit performs the operation based on the acquired control information. For example, the first external device 830 may play the drum based on the tempo, the play bar, and the play starting time. As another example, the second external device 850 may play the guitar based on the tempo, the play bar, and the play starting time.

Figure 9:
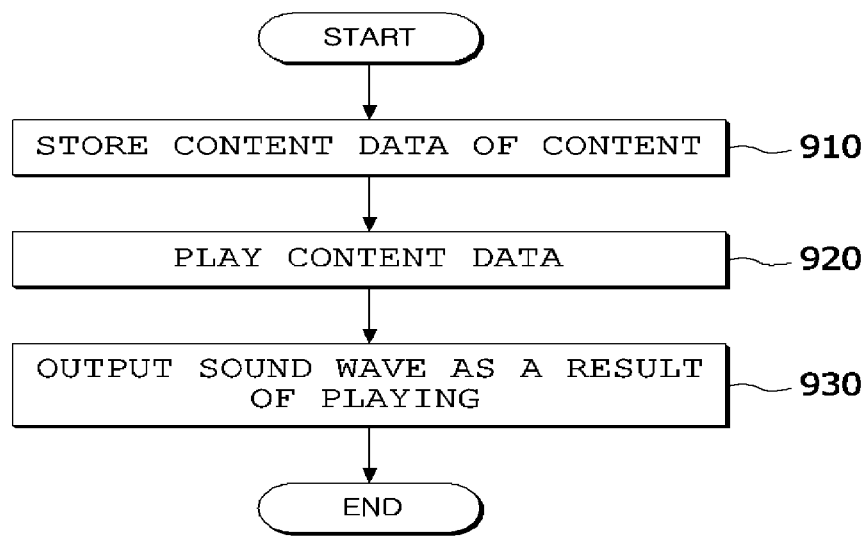
FIG. 9 is a flow chart illustrating an operation of a method for generating sound wave data using a sound wave output device according to an embodiment of the present invention.

FIG. 9 is a flow chart illustrating an operation of a method for generating sound wave data using the device 100 according to an embodiment of the present invention.

The method for generating sound data performed by the device 100 according to the embodiment illustrated in FIG. 9 includes steps processed time serially in the smart control system 1 according to the embodiment illustrated in FIG. 1. Therefore, although the contents which will not be described below, the contents already described with respect to the smart control system 1 according to the embodiment illustrated in FIG. 1 may be applied to the method for generating a sound wave performed by the device 100 according to the embodiment illustrated in FIG. 9.

In step S910, the storage unit 110 of the device 100 stores the content data of content. In step S920, the playing unit 120 of the device 100 plays the content data. In this case, the step of playing the content data may play the content data and the sound wave data. In step S930, the output unit 130 of the device 100 plays the sound wave as a result of the playing of the content data. In this case, the sound wave allows the external device 200 to initiate the operation associated with the content.

Although not illustrated in FIG. 9, the method for generating a sound wave performed by the device 100 may further include generating the control information associated with the content and generating the sound wave data corresponding to the control information.

In the foregoing description, according to the implementation example of the present invention, steps S910 to S930 may be divided into additional steps or combined as fewer steps. Further, some steps may be omitted if necessary and an order of the steps may be changed.

The method for generating a sound wave described with reference to FIG. 9 may be implemented even as a recording medium form including instructions executable by a computer such as a program module executed by the computer. A computer-readable medium may be any available medium which may be accessed by the computer, and include all volatile and non-volatile media and separable and non-separable media. Further, the computer readable medium may include both of a computer storage medium and a communication medium. The computer storage medium includes all of the volatile and non-volatile media and the separable and non-separable media which are implemented by a computer-readable instruction, a data structure, a program module or any method or technique for storing information such as other data. The communication medium typically includes the computer readable instruction, the data structure, the program module, other data of a modulated data signal such as a carrier wave, or other transmission mechanism, and include any information transmission medium.

The foregoing description of the present invention is only an example and those skilled in the art will appreciate that the present invention may be easily changed to other detailed forms, without departing from technical ideas or essential features of the present invention. Therefore, it should be understood that the above-mentioned embodiments are not restrictive but are exemplary in all aspects. For example, each component described as a single type may be dispersed and practiced and components which are described as being similarly dispersed may be practiced in a combined form.

It should be interpreted that the scope of the present invention is defined by the following claims rather than the above-mentioned detailed description and all modifications or alterations deduced from the meaning, the scope, and equivalences of the claims are included in the scope of the present invention.

The invention claimed is:

1. A device for outputting a sound wave, comprising:
a storage unit configured to store content data of content;
a control information generation unit configured to generate control information including synchronization information or time information corresponding to the content, wherein the control information generation unit generates first control information and second control information; and
a sound wave data generation unit configured to generate first sound wave data corresponding to the first control information and second sound wave data corresponding to the second control information, a playing unit configured to play the first sound wave data, the second sound wave data, and the content data, and an output unit configured to output a first sound wave and a second sound wave as a result of playing the first sound wave data, the second sound wave data, and the content data, wherein the output unit comprises a speaker, wherein the first sound wave causes a first external device to initiate a first operation associated with the content, and the second sound wave causes a second external device to initiate a second operation associated with the content, and wherein the first external device and the second external device each further comprise a microphone configured to receive the first sound wave and the second sound wave;

wherein the first operation is different from the second operation, and;

wherein the first operation corresponding to the first sound wave data and the second operation corresponding to the second wave data are synchronized with the playing of the content data, based on tempo, play bar, and play starting time of the content data;

wherein the first sound wave is within a range of 100 Hz to 16000 Hz, wherein the second sound wave is within a range of 16000 Hz to 24000 Hz.

2. The device of claim 1, wherein the output unit outputs the first sound wave corresponding to the content data played through a sound wave output device, and outputs the second sound wave corresponding to the sound wave data played through the sound wave output device.

3. The device of claim 1, wherein the device is a mobile device and the content is a music content.

4. The device of claim 1, further comprising:
a display unit configured to display an image or a text on the display of the device as a result of the playing of the content data.

5. The device of claim 1, wherein the first operation displays a first image on a display of the first external device and wherein the second operation displays a second image on a display of the second external device, wherein the first image is different from the second image.

* * * * *